US012378923B1

(12) United States Patent
Patel et al.

(10) Patent No.: US 12,378,923 B1
(45) Date of Patent: Aug. 5, 2025

(54) EXHAUST VANE BRAKING TRANSITION AND CORRECTION STRATEGY

(71) Applicant: FCA US LLC, Auburn Hills, MI (US)

(72) Inventors: Bindal Patel, Auburn Hills, MI (US); Joseph Falcon, Auburn Hills, MI (US); William P Attard, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/884,258

(22) Filed: Sep. 13, 2024

(51) Int. Cl.
*F02D 41/00* (2006.01)
*F02B 37/24* (2006.01)

(52) U.S. Cl.
CPC .......... *F02D 41/0007* (2013.01); *F02B 37/24* (2013.01)

(58) Field of Classification Search
CPC ............................ F02B 37/24; F02D 41/0007
See application file for complete search history.

(56) References Cited

U.S. PATENT DOCUMENTS

2010/0168976 A1* 7/2010 Andrasko ....... B60W 30/18136 701/70

* cited by examiner

*Primary Examiner* — Ngoc T Nguyen
(74) *Attorney, Agent, or Firm* — Jeremy J. Klobucar

(57) ABSTRACT

A control system and method for operating a gasoline engine comprising a turbocharger having a compressor and a turbine is provided. The system includes a throttle, vanes on the turbine, at least one cam, and a controller. The controller controls a transition into vane braking and is configured to: command the throttle to move to the closed position; command the vanes to the open position; determine whether additional negative torque is required; activate vane braking based on the determination that additional negative torque is required; command the vanes to the closed position; command the at least one cam to a maximum volumetric efficiency position; determine whether the at least one cam is at a maximum volumetric efficiency position; and command the throttle to the open position based on the determination that the at least one cam is at the maximum volumetric efficiency position.

14 Claims, 7 Drawing Sheets

EXHAUST VANE BRAKING TRANSITION AND CORRECTION STRATEGY

FIELD

The present application relates to exhaust vane braking on an internal combustion engine and, more particularly, to a control system that manages transitions into and out of exhaust vane braking while minimizing an amount of torque changes.

BACKGROUND

For an internal combustion gasoline engine, when a driver releases an accelerator pedal and wishes to coast-down, the engine must output negative torque to slow the vehicle down. Current strategies involve increasing pumping work by closing the throttle to a point that only allows a minimum amount of airflow through the engine. During this time, the engine shuts off fueling and pumps a minimum amount of air through the engine. This minimum airflow is determined through various hardware and system limits. As there is a minimal amount of air flowing into the manifold, this will decrease the manifold pressure. In normal conditions, closing the throttle will bring the manifold pressure down such as, but not limited to, around 15-20 kPa depending upon engine parameters. Meanwhile, the exhaust pressure will remain around 100 kPa (barometric). This difference in the intake manifold pressure and exhaust pressure is what generates most of the pumping losses within the engine. This pumping work directly relates to the negative torque output of the engine (engine braking).

As the automotive industry moves to downsize engines, the pumping work of these smaller engines also decreases. This can cause the engine brake torque capability to decrease as well. In this case, the vehicle will not coast-down as aggressively as needed. This will force the drivers to use the friction brakes more, which is undesirable. Accordingly, a need exists in the art to improve upon braking solutions for vehicles that incorporate gasoline engines.

SUMMARY

According to one example aspect of the invention, a control system for a gasoline engine comprising a turbocharger having a compressor and a turbine includes a throttle, vanes on the turbine, at least one cam, and a controller. The throttle moves between open and closed positions to permit air into an intake manifold of the engine. The vanes move between open and closed positions by a vane actuator to control an amount of exhaust air that flows through the turbine. Depending on the camshaft hardware, the intake and exhaust camshaft positions can be optimized allow higher amounts of air to flow through the engine. The controller controls a transition into vane braking and is configured to: command the throttle to move to the closed position; command the vanes to the open position; determine whether additional negative torque is required; activate vane braking based on the determination that additional negative torque is required; command the vanes to the closed position; command the at least one cam to a maximum volumetric efficiency position; determine whether the at least one cam is at a maximum volumetric efficiency position; and command the throttle to the open position based on the determination that the cam is at the maximum volumetric efficiency position.

In some implementations, the controller is further configured to: determine whether vane braking is active, and based on a determination that vane braking is active: deactivate vane braking based on a determination that additional negative torque is not required; command the throttle to move to the closed position; command the vanes to the open position; command the at least one cam to a fuel shut off calibrated position.

In other implementations, the controller is further configured to: determine whether the vanes are open; and end the transition out of vane braking based on a determination that the vanes are open.

In additional implementations, the controller is configured to: determine whether the at least one cam is at the fuel shut off calibrated position; and end the transition out of vane braking based on the determination that the at least one cam is at the fuel shut off calibrated position.

In other features, the controller is further configured to: determine, based on activated vane braking, a pressure ratio between a manifold pressure and barometric pressure; determine, based on activated vane braking, a revolutions per minute (RPM) of the engine; and provide an estimated brake torque correction based on the pressure ratio and the RPM.

In additional features, the controller is further configured to: provide a volumetric efficiency correction based on the pressure ratio and the RPM.

In other features, the controller is further configured to: provide a catalyst temperature correction based on activated vane braking.

According to another example aspect of the invention, a method of controlling vane braking on an internal combustion engine is provided. The gasoline engine has a turbocharger including a compressor and a turbine, the engine further having: a throttle that moves between open and closed positions to permit air into an intake manifold of the engine; vanes provided on the turbine that move between open and closed positions by a vane actuator to control an amount of exhaust air that flows through the turbine; at least one cam that rotates causing a valve to open and allow an amount of air to flow through the engine, the at least one cam having a cam actuator that impacts the rotation of the at least one cam; and a controller that controls a transition into vane braking. The method comprises: commanding, at the controller, the throttle to move to the closed position; commanding, at the controller, the vanes to the open position; determining, at the controller, whether additional negative torque is required; activating vane braking based on the determination that additional negative torque is required; commanding, at the controller, the vanes to the closed position; commanding, at the controller, the at least one cam to a maximum volumetric efficiency position; determining, at the controller, whether the at least one cam is at a maximum volumetric efficiency position; and commanding, at the controller, the throttle to the open position based on the determination that the at least one cam is at the maximum volumetric efficiency position.

In some implementations, the method further includes transitioning out of vane braking. The controller: determines whether vane braking is active, and based on a determination that vane braking is active: deactivates vane braking based on a determination that additional negative torque is not required; commands the throttle to move to the closed position; commands the vanes to the open position; and commands the at least one cam to a fuel shut off calibrated position.

In some implementations, the method includes: determining whether the vanes are open; and ending the transition out of vane braking based on a determination that the vanes are open.

In other implementations of the method, the controller: determines whether the at least one cam is at the fuel shut off calibrated position; and ends the transition out of vane braking based on the determination that the at least one cam is at the fuel shut off calibrated position In additional implementations of the method, the controller: determines, based on activated vane braking, a pressure ratio between a manifold pressure and barometric pressure; determines, based on activated vane braking, a revolutions per minute (RPM) of the engine; and provides an estimated brake torque correction based on the pressure ratio and the RPM.

In additional implementations, the method provides a volumetric efficiency correction based on the pressure ratio and the RPM.

In additional implementations, the method provides a catalyst temperature correction based on activated vane braking.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
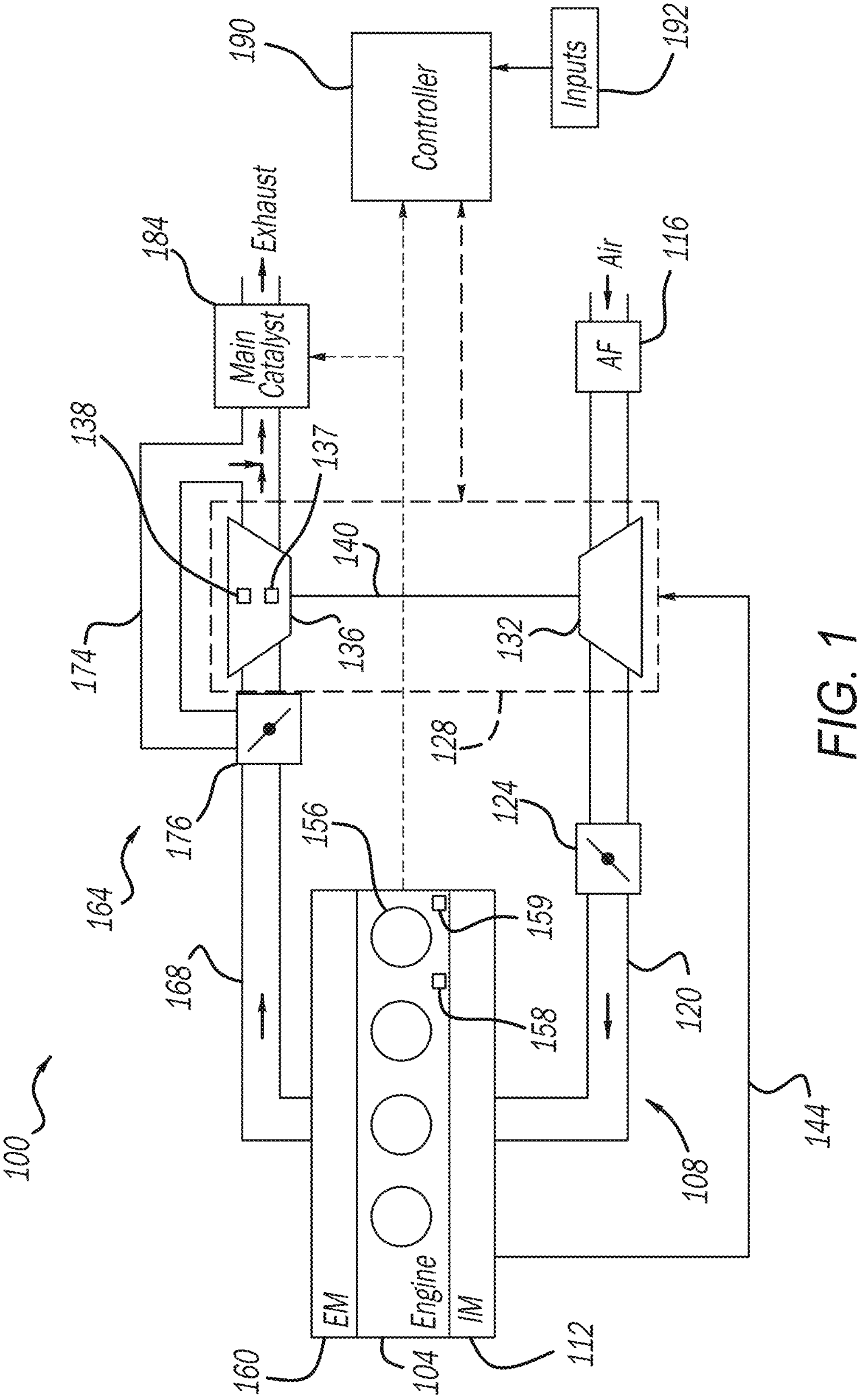
FIG. 1 is a diagram of an example vehicle comprising a turbocharged engine and incorporating a control system that manages transitions into and out of exhaust vane braking while minimizing an amount of torque changes according to the principles of the present disclosure.

A variable geometry turbine (VGT) includes adjustable vanes within the turbine housing to control the flow through the turbine. At higher RPM's, when the vanes are fully open, the air can flow through the turbine normally. Conversely, at lower RPM's, the vanes are adjusted to create more boost by angling the flow to the blades. If the hardware is designed appropriately, the vanes can be closed far enough that it will create a very tight space for the air to flow through. In this case, the air flow will be restricted, causing an increase in exhaust backpressure.

Vane braking involves opening the throttle and closing the VGT vanes to generate negative torque during a vehicle coast-down. This restricts the flow creating exhaust back pressure, which leads to more pumping work than a standard engine. Exhaust vane braking has not been incorporated for a gasoline engine in part because the coordination of all the airflow actuators can cause an undesirable jump in torque during the transition into and out of exhaust vane braking. In this regard, the available pumping work out of a conventional engine braking system is the maximum pumping capability. Diesel applications have an exhaust braking feature to increase brake torque capability, but the actuator strategy is different as they do not have an intake throttle. Diesel applications close and actively control the variable geometry turbine vanes to manage airflow based on the required torque output. As there has not been a gasoline application, there has also not been a transition or torque control strategy involving a throttle.

The present disclosure is directed toward a system and method for transitioning into an exhaust vane braking mode to generate more brake torque, while minimizing other unnecessary torque jumps. Vane braking is activated once conventional fuel shut off engine braking has been entered. This way, the throttle is closed and the airflow through the engine is minimum. While the throttle is closed, closing the VGT vanes and moving the cams to maximum Volumetric Efficiency (VE) will have a minimal impact on torque. Unnecessary torque jumps are avoided. Once the VGT vanes are closed and the cams are shifted to maximum airflow, the throttle can be opened to allow airflow into the engine. This will increase the pumping work and decrease the engine brake torque. The throttle can be used to actively control the amount of airflow into the engine, which will allow variable control of brake torque.

Exhaust vane braking increases the pumping work compared to conventional fuel shut off engine braking. When there is a higher negative torque output required from the engine, instead of closing the throttle and opening the VGT vanes, the throttle is opened and the VGT vanes are closed. This allows high air flow through the throttle, and the manifold pressure would be at barometric or above (if the compressor is generating boost). On the other hand, the closed vanes will increase the exhaust back pressure to around 300 kPa at higher RPM's. This difference in intake and exhaust pressure is much greater than conventional engine braking with the throttle closed. Additionally, cam phasers are used to change the intake valve and exhaust valve opening and closing times to allow maximum amount of air to flow through the engine (maximum volumetric efficiency cams). All of this combined will increase pumping work for the engine, in turn, producing a larger negative torque output.

The present disclosure provides a method to smoothly transition into and out of exhaust vane braking while minimizing the amount of torque changes (torque jumps). A current fuel shut-off engine braking strategy is to close the throttle, open the VGT vanes, and have some fixed cam positions. As more engine braking is required, the engine controller will need to reposition these actuators to begin exhaust vane braking. Since the throttle is already closed, and minimum air is flowing through the engine, moving the cams and the VGT vanes will not cause a large torque change. In a first step, the VGT vanes are closed and the cams are moved to VE cams. Once these actuators are in the desired locations, the throttle will start to open slowly. The slow transition of the throttle is important, since quickly actuating the throttle open can cause an unpleasant torque jump. Next, the throttle is adjusted (part throttle to fully open throttle) to control the amount of airflow through the system. This can help actively control the pumping work/torque output of the engine.

When it is desirable to exit this feature, the manifold will need to be depleted to avoid any large torque jumps during refueling. This is achieved by slowly closing the throttle to deplete the manifold and lowering the airflow through the system. At this point, the other actuators can be set to where they were before entering this feature (open VGT vanes, move cams back to previously fixed position). This actuator coordination and transition strategy allows exhaust vane braking to provide the maximum amount of brake torque while avoiding any unnecessary torque jumps. While the following discussion is in the context of an internal combustion engine, the concepts can be used on any combustion mode, diesel or mixed mode combustion.

Referring now to FIG. 1, a diagram of an example vehicle or vehicle control system 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a variable geometry turbine) of the turbocharger 136 via a shaft 140. The turbine 136 includes vanes 137 that are actuated between open and closed positions by a vane actuator 138.

The pressurized air is distributed to a plurality of cylinders 156 and combined with fuel (e.g., from respective direct-injection or port-injection fuel injectors) to form an air/fuel mixture. The engine 104 includes a valvetrain having a series of intake and exhaust rocker arm valve assemblies. The intake and exhaust rocker arm assemblies rotate based on interaction with intake and exhaust camshafts, collectively identified as camshafts 158. The intake and exhaust rocker arm assemblies open and close intake and exhaust valves on the engine 104. An actuator 159 can alter cam positioning to achieve desired levels of open and closed. In the example provided, the camshafts 158 and actuator 159 can comprise cam phasers that are used to change the intake valve and exhaust valve opening and closing times to allow for maximum amount of air to flow through the engine 104, also referred to herein as maximum volumetric efficiency (VE) cams. Other hardware is contemplated for altering a timing of the cams within the scope of the present disclosure.

While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A bypass passage 174 can route exhaust air around the turbine 136 based on a position of a valve 176. The valve 176 moves between a fully open position whereby all exhaust gas is routed to the turbine 136, a fully closed position whereby all exhaust gas is routed through the bypass passage 174, and infinite positions therebetween. A main exhaust gas treatment system 184, such as a catalytic converter, treats exhaust gas to decrease or eliminate emissions before it is released into the atmosphere. All exhaust gas regardless of passing through the turbine 136 or the bypass passage 174 is directed to the main exhaust gas treatment system 184.

Lubrication oil from the engine 104 is routed through an oil line 144 to the turbocharger 128 to lubricate components of the turbocharger 128. In examples, the oil is sourced from the engine 104 at the sump.

A controller, also referred to herein as an engine controller, 190 controls operation of the vehicle 100. Examples of components controlled by the controller 190 include the engine 104, the throttle valve 124, the vane actuator 138 and the cam actuator 159. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 190 controls operation of these various components based on measured and/or modeled parameters. Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Figure 2:
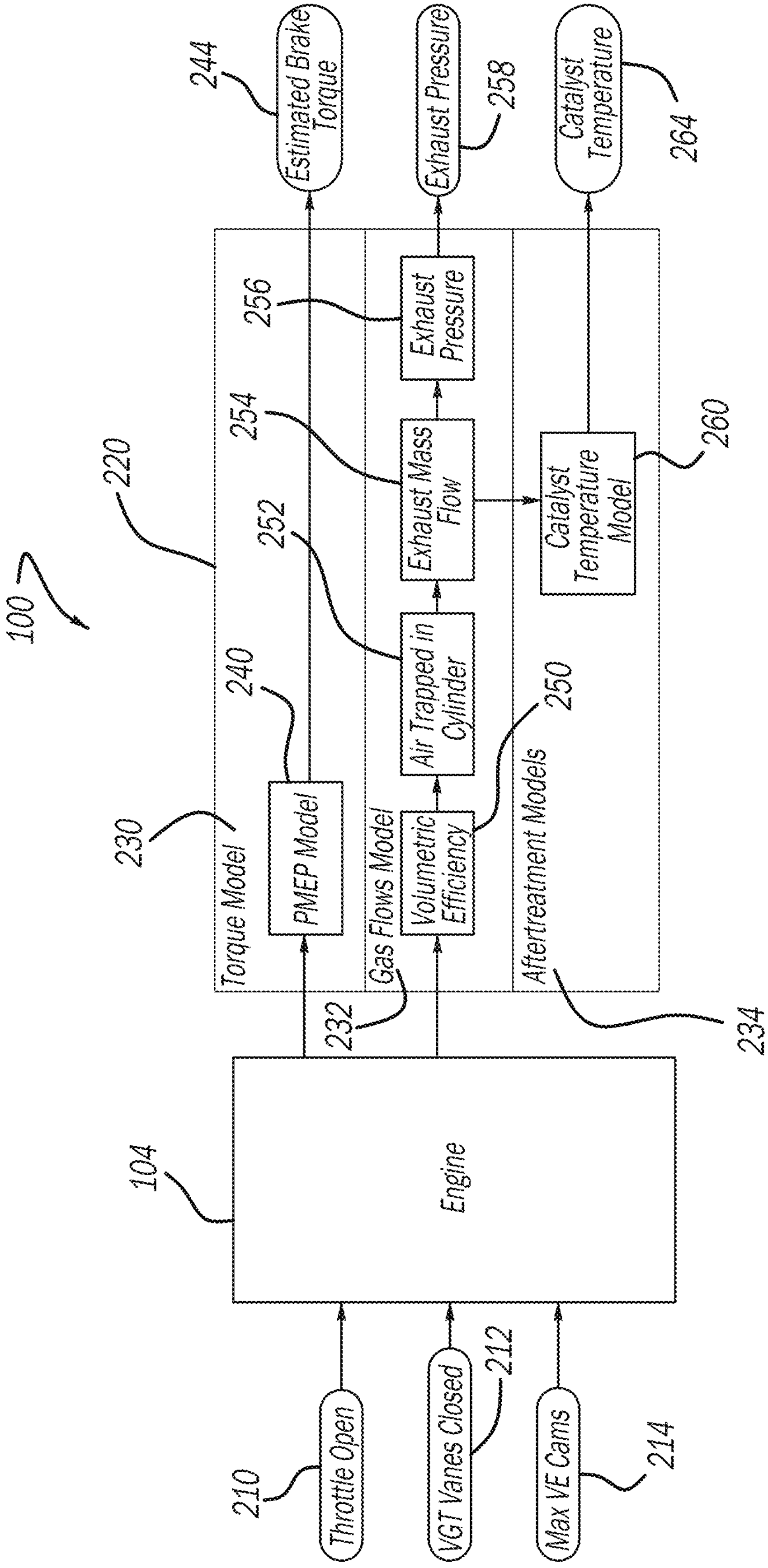
FIG. 2 is a system overview that implements the control system of FIG. 1 according to examples of the present disclosure.

Turning now to FIG. 2, the control system 100 FIG. 1 will be further described. The engine 104 receives a throttle open input 210, a VGT vanes closed input 212 and a maximum VE cams input 214. A models implementation module 220 includes a torque model 230, a gas flows model 232 and an aftertreatment model 234. The torque model 230 includes a pumping mean effective pressure (PMEP) model 240 that outputs an estimated brake torque 244. The gas flows model 232 includes a volumetric efficiency module 250 that determines a volumetric efficiency, an air trapped in cylinder module 252 that determines a volume of air trapped in the cylinder, an exhaust mass flow module 254 that determines an exhaust mass flow, and an exhaust pressure module 256 that determines an exhaust pressure. The pressure drop due to the turbine 136 is a function of RPM and exhaust mass flow. The exhaust mass flow needs to be corrected to get a correct upstream turbine total pressure (exhaust pressure which impacts the PMEP). Exhaust flow is a function of the amount of air mass trapped in the cylinder. The amount of air mass trapped in the cylinder is a function of the VE estimation model. Therefore, the VE model is corrected to get the correct exhaust pressure estimation. The gas flows model 232 outputs an exhaust pressure 258. As used herein, the term "module" can mean a model or other part of the controller 190.

The aftertreatment models 234 includes a catalyst temperature model 260 that outputs a catalyst temperature 264. The catalyst temperature model 260 assumes a steady state temperature that the catalyst will reach during fuel shut-off. It also calculates a filter factor based on the air mass flow rate through the catalyst. This filter models how slowly the temperature will change to get to that steady state estimation. With vane braking, the change is the overall system (positions of the actuators 138, 159) will change the mass flow rate and change how the catalyst cools down. This change is corrected in the catalyst temperature model.

Figure 3:
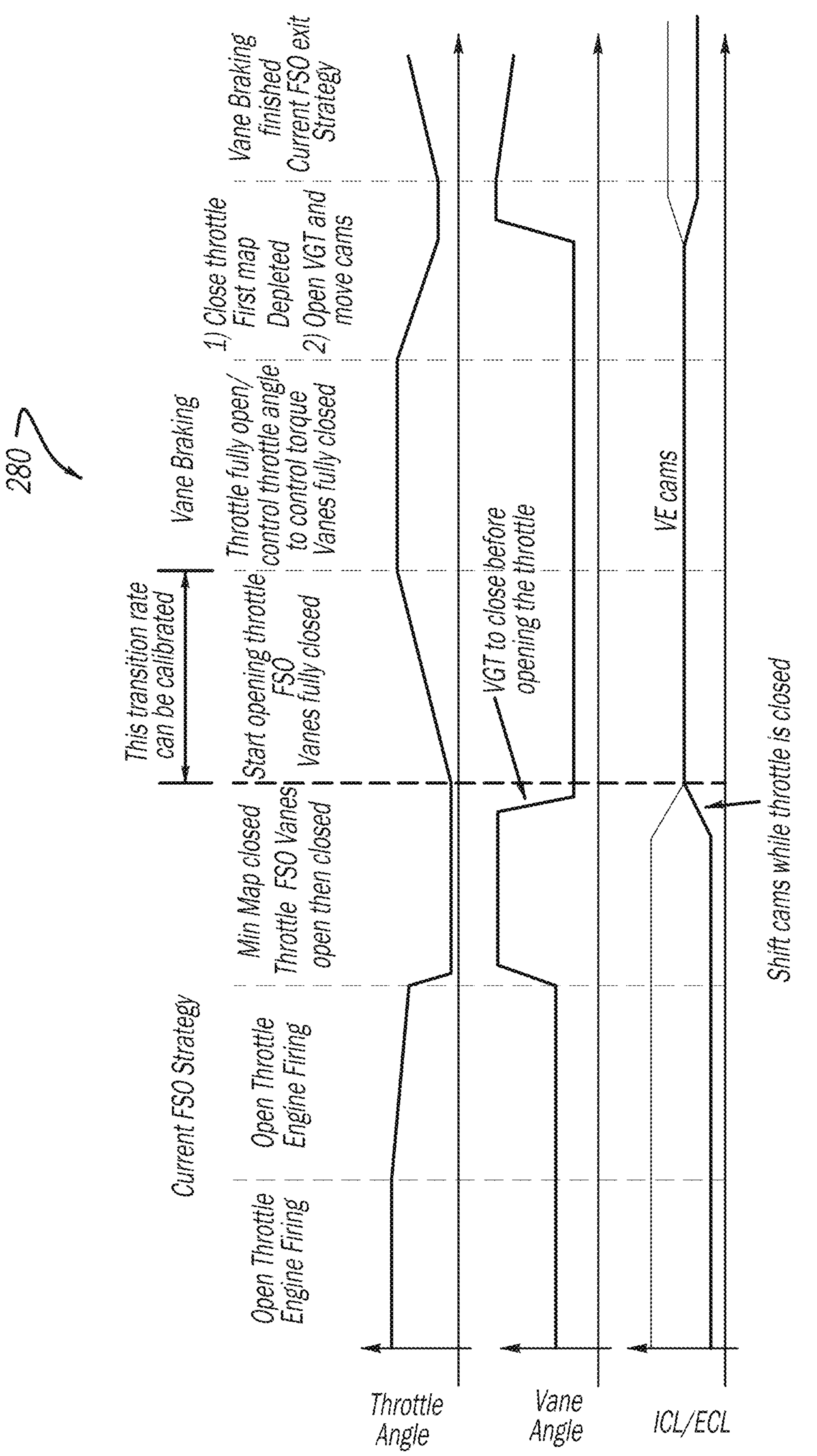
FIG. 3 is a plot illustrating throttle angle, vane angle, intake/exhaust centerline positions while implementing the vane braking techniques according to examples of the present disclosure.

FIG. 3 is a plot 280 illustrating throttle angle, vane angle, intake/exhaust centerline positions while implementing the vane braking techniques according to examples of the present disclosure.

Figure 4:
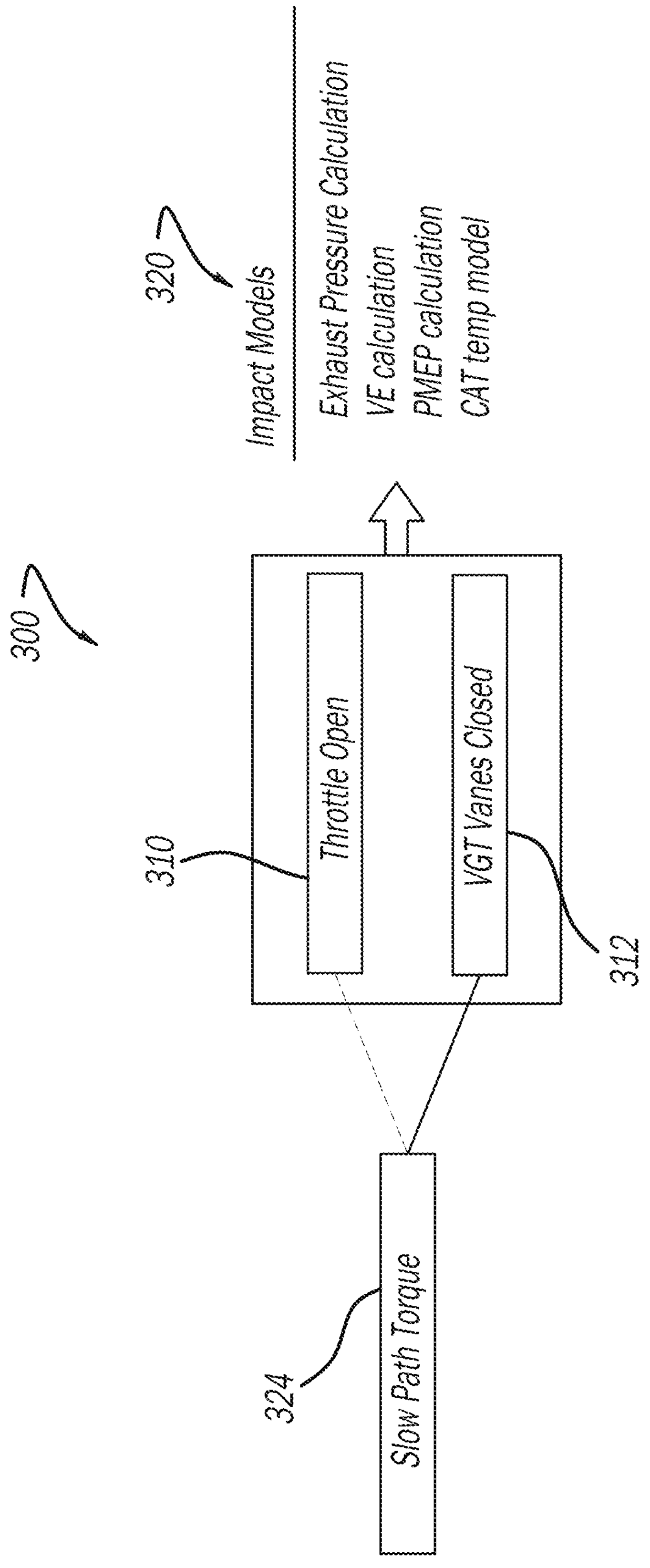
FIG. 4 is a diagram illustrating throttle open and VGT vanes closed targets and their impact on models according to examples of the present disclosure.

FIG. 4 is a diagram 300 illustrating a throttle open target 310 and a VGT vanes closed target 312 and their impact on models 320 according to examples of the present disclosure. The present disclosure corrects the existing controls models that have been impacted by the changes made by the vane braking. The torque model is impacted due to the increase in exhaust pressure. This change in torque must be corrected based on a pressure ratio (manifold pressure/barometric) and an RPM of the engine 104. The exhaust pressure model is corrected by correcting the exhaust mass air flow. The exhaust mass flow is a function of the amount of air that is trapped in the cylinder, which is a function of the volumetric efficiency. A similar correction surface must be calibrated to correct the volumetric efficiency based on a pressure ratio (manifold pressure/barometric) and an RPM of the engine 104.

A slow path torque 324 provides inputs to the targets 310, 312. As noted above, entering exhaust vane braking will restrict the air flow through the VGT 136 causing the exhaust back pressure to build up. This increase in back pressure will change the pumping work, which will in turn change the brake torque. In prior art techniques, the torque model 230 is not expecting a large exhaust pressure during fuel shut off engine braking. The present disclosure corrects this by adding the PMEP model 240 when operating in exhaust vane braking. This correction surface will be a function of the amount of air coming into the engine 104, as this can change the final exhaust pressure. One way to correlate the amount of air in the engine 104 is based on the pressure ratio (manifold pressure/barometric pressure) and the engine speed. This PMEP correction term provided by the PMEP model 240 will be a function of pressure ratio and engine speed and results in an estimated brake torque 244.

With the VGT vanes 137 closed, the exhaust pressure will increase significantly compared to a conventional engine braking. This increase in pressure needs to be captured in the gas flows model 232. The exhaust pressure (upstream of the turbine 136) is estimated by calculating the upstream catalyst pressure (barometric pressure minus drop in pressure through the catalyst 184. After which a drop in pressure across the turbine 136 is subtracted from downstream turbine pressure to finally get upstream turbine pressure (exhaust pressure). This drop in pressure across the turbine 136 is a function of the air mass flow. This drop in pressure calculation needs to be corrected to estimate a correct upstream turbine pressure.

The correction provided by the gas flows model 232 will now be described in more detail. The air flow through the engine 104 impacts the exhaust pressure calculation and since the air flow will be largely impacted by the vane braking disclosed herein, it needs to be corrected. Exhaust mass flow is calculated by estimating the amount of air mass trapped in the cylinder. This air mass trapped comes from volumetric efficiency calculations There is a correction to the volumetric efficiency model 250 to correct the downstream models discussed above. This correction will similarly be a function of the pressure ratio (manifold pressure/barometric pressure) and the speed of the engine 104.

The correction provided by the aftertreatment models 234 will now be described in greater detail. The catalyst temperature model assumes a steady state temperature that the catalyst 184 will reach during fuel shut off. It also calculates a filter factor based on the air mass flow rate through the catalyst. The filter models how slowly the temperature will change to get to that steady state estimation. With vane braking, the change in the overall system (specifically the positions of the actuators 138 and 159) will change the mass flow rate and change how the catalyst cools down. This change is corrected in the catalyst temperature model 260.

Figure 5:
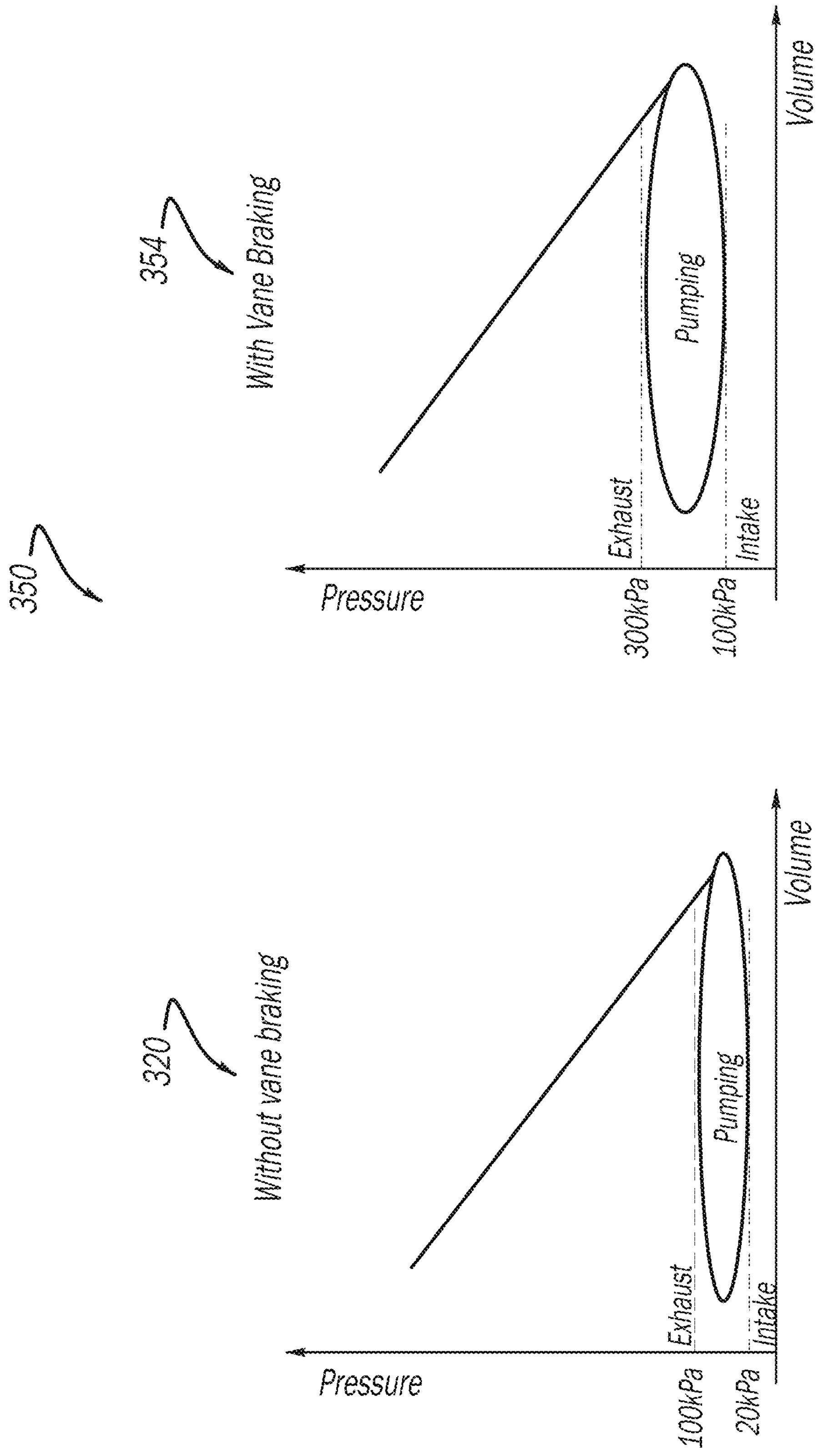
FIG. 5 illustrates brake torque comparisons without vane braking versus with vane braking according to examples of the present disclosure.

FIG. 5 illustrates brake torque comparisons 350 including pumping pressure without vane braking 352 versus pumping pressure with vane braking 354 according to examples of the present disclosure. The change in the exhaust backpressure will change the pumping work. As the brake torque is directly related to the pumping work, there needs to be a correction to the torque model 230 (FIG. 2).

Figure 6:
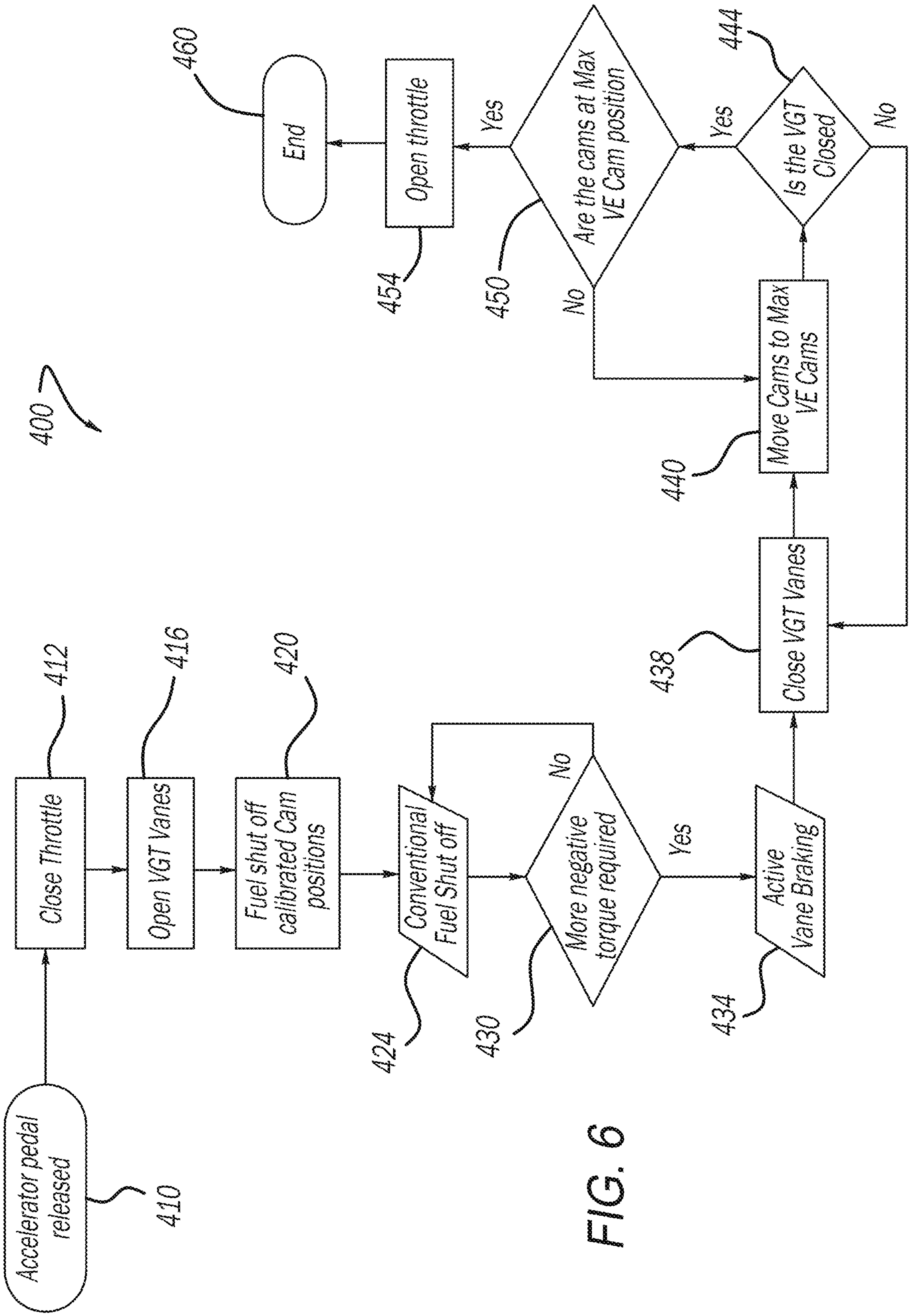
FIG. 6 is a flow diagram illustrating a control strategy for entering vane braking according to examples of the present disclosure.

FIG. 6 is a flow diagram illustrating a control method 400 for entering vane braking according to examples of the present disclosure. At 410, control determines, based on inputs 192, that the accelerator pedal has been released. At 412 the throttle 124 is closed. At 416, the VGT vanes 137 are opened (e.g., by commanding the vane actuator 138 to open the vanes 137). At 420, the fuel is shut off at calibrated cam positions. At 424 control commands a conventional fuel shut off. At 430 control determines whether more negative torque is required. If more negative torque is not required, control loops to 424. If more negative torque is required, control activates vane braking at 434. At 438 control closes the VGT vanes (e.g., by commanding the vane actuator 138 to actuate the vanes 137 to the closed position). At 440, control commands the cams 158 to the maximum VE cam position (e.g., by commanding the actuator 159). At 444, control determines whether the VGT is closed. If control determines that the VGT is not closed, control loops to 438. If control determines that the VGT is closed at 444, control determines whether the cams 158 are at the maximum VE cam position at 450. In examples, the cams 158 can include the intake cams, however in some examples, the intake and exhaust cams can be used based on operating conditions. If control determines that the cams 158 are not at the maximum VE cam position at 450, control loops to 440. If control determines that the cams 158 are at the maximum VE cam position at 450, control opens the throttle 124 at 454. Control ends at 460.

Figure 7:
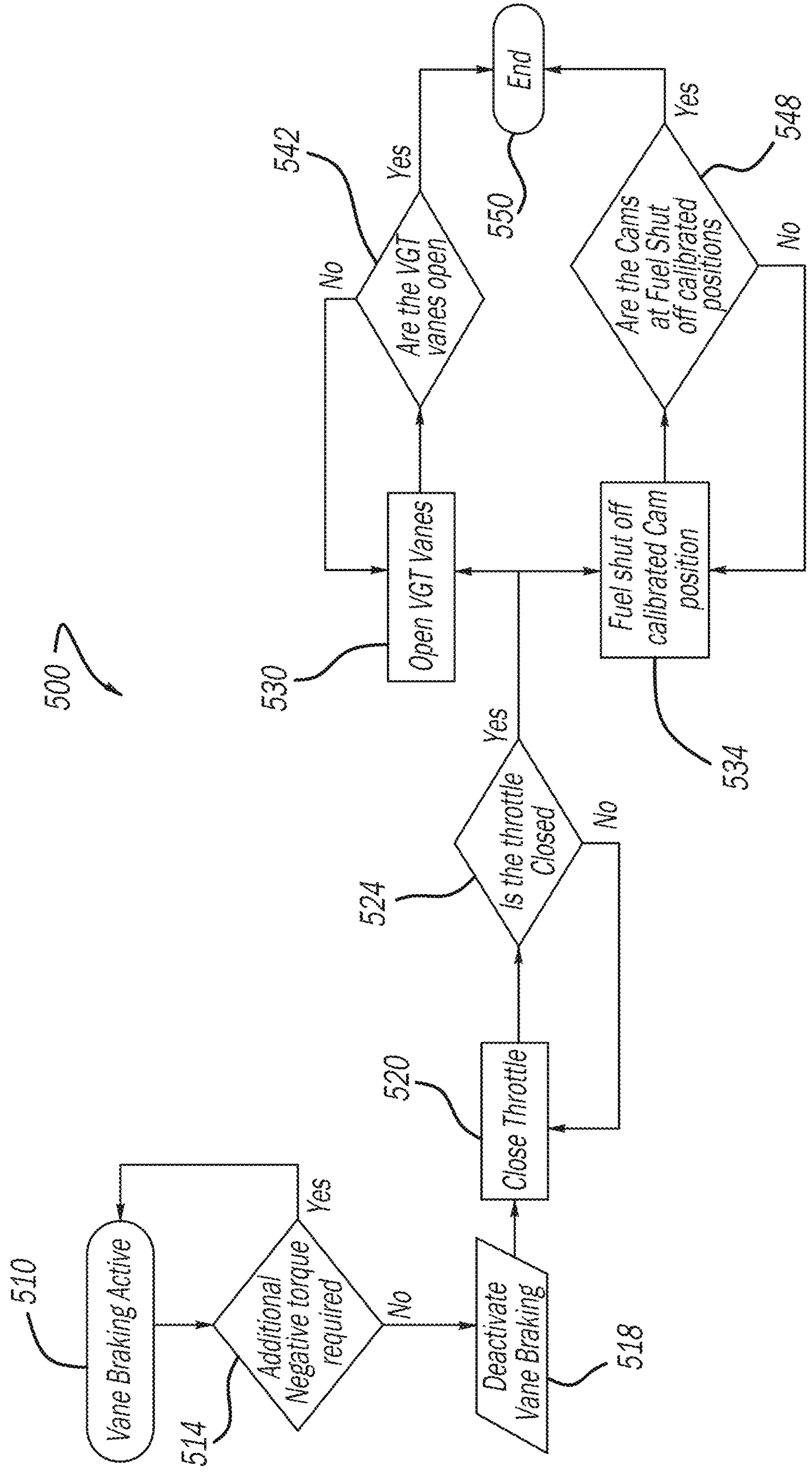
FIG. 7 is another flow diagram illustrating a control strategy for exiting vane braking according to examples of the present disclosure.

FIG. 7 is a flow diagram illustrating a control method 500 for exiting vane braking according to examples of the present disclosure. At 510 control determines that vane braking is active. At 514 control determines whether additional negative torque is required. If control determines that additional negative torque is required at 514, control loops to 510. If control determines that additional negative torque is not required at 514, control deactivates vane braking at 518. At 520, control closes the throttle 124. At 530 control opens the VGT vanes 137. At 534 control commands fuel shut off at calibrated cam positions. At 542 control determines whether the VGT vanes 137 are open. If control determines that the VGT vanes 137 are not open, control loops to 530. If control determines that the VGT vanes 137 are open, control ends at 550. At 548, control determines whether the cams 158 are at fuel shut off calibrated positions. If control determines that the cams 158 are not at the fuel shut off calibrated positions, control loops to 534. If control determines that the cams are at fuel shut off calibrated positions at 548, control ends at 550.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a gasoline engine comprising a turbocharger having a compressor and a turbine, the system comprising:

a throttle that moves between open and closed positions to permit air into an intake manifold of the engine;

vanes provided on the turbine that move between open and closed positions by a vane actuator to control an amount of exhaust air that flows through the turbine;

at least one cam that rotates causing a valve to open and allow an amount of air to flow through the engine, the at least one cam having a cam actuator that impacts the rotation of the at least one cam;

a controller that controls a transition into vane braking, the controller configured to:

command the throttle to move to the closed position;

command the vanes to the open position;

determine whether additional negative torque is required;

activate vane braking based on the determination that additional negative torque is required;

command the vanes to the closed position;

command the at least one cam to a maximum volumetric efficiency position;

determine whether the at least one cam is at a maximum volumetric efficiency position; and command the throttle to the open position based on the determination that the at least one cam is at the maximum volumetric efficiency position.

2. The control system of claim 1, wherein the controller further controls a transition out of vane braking, the controller configured to:

determine whether vane braking is active, and based on a determination that vane braking is active:

deactivate vane braking based on a determination that additional negative torque is not required;

command the throttle to move to the closed position;

command the vanes to the open position; and command the at least one cam to a fuel shut off calibrated position.

3. The control system of claim 2, wherein the controller is configured to:

determine whether the vanes are open; and end the transition out of vane braking based on a determination that the vanes are open.

4. The control system of claim 2, wherein the controller is configured to:

determine whether the at least one cam is at the fuel shut off calibrated position; and end the transition out of vane braking based on the determination that the at least one cam is at the fuel shut off calibrated position.

5. The control system of claim 1, wherein the controller is further configured to:

determine, based on activated vane braking, a pressure ratio between a manifold pressure and barometric pressure;

determine, based on activated vane braking, a revolutions per minute (RPM) of the engine; and provide an estimated brake torque correction based on the pressure ratio and the RPM.

6. The control system of claim 5, wherein the controller is further configured to:

provide a volumetric efficiency correction based on the pressure ratio and the RPM.

7. The control system of claim 5, wherein the controller is further configured to:

provide a catalyst temperature correction based on activated vane braking.

8. A method of controlling vane braking on a gasoline engine having a turbocharger including a compressor and a turbine, the engine further having: a throttle that moves between open and closed positions to permit air into an intake manifold of the engine; vanes provided on the turbine that move between open and closed positions by a vane actuator to control an amount of exhaust air that flows through the turbine; at least one cam that rotates causing a valve to open and allow an amount of air to flow through the engine, the at least one cam having a cam actuator that impacts the rotation of the at least one cam; and a controller that controls a transition into vane braking, the method comprising:

commanding, at the controller, the throttle to move to the closed position;

commanding, at the controller, the vanes to the open position;

determining, at the controller, whether additional negative torque is required;

activating vane braking based on the determination that additional negative torque is required;

commanding, at the controller, the vanes to the closed position;

commanding, at the controller, the at least one cam to a maximum volumetric efficiency position;

determining, at the controller, whether the at least one cam is at a maximum volumetric efficiency position; and commanding, at the controller, the throttle to the open position based on the determination that the at least one cam is at the maximum volumetric efficiency position.

9. The method of claim 8, wherein the controller further controls a transition out of vane braking, wherein the controller:

determines whether vane braking is active, and based on a determination that vane braking is active:

deactivates vane braking based on a determination that additional negative torque is not required;

commands the throttle to move to the closed position;

commands the vanes to the open position; and commands the at least one cam to a fuel shut off calibrated position.

10. The method of claim 9, wherein the controller:
determines whether the vanes are open; and
ends the transition out of vane braking based on a determination that the vanes are open.

11. The method of claim 10, wherein the controller:
determines whether the at least one cam is at the fuel shut off calibrated position; and
ends the transition out of vane braking based on the determination that the at least one cam is at the fuel shut off calibrated position.

12. The method of claim 8, wherein the controller:
determines, based on activated vane braking, a pressure ratio between a manifold pressure and barometric pressure;
determines, based on activated vane braking, a revolutions per minute (RPM) of the engine; and
provides an estimated brake torque correction based on the pressure ratio and the RPM.

13. The method of claim 12, wherein the controller:
provides a volumetric efficiency correction based on the pressure ratio and the RPM.

14. The method of claim 12, wherein the controller:
provides a catalyst temperature correction based on activated vane braking.

* * * * *